June 24, 1969 R. E. LE JEUNE 3,451,634

TAPE HANDLING MECHANISM

Filed Aug. 15, 1967 Sheet 1 of 2

INVENTOR
RAYMOND E. LE JEUNE

BY R. C. Terry

ATTORNEY

United States Patent Office 3,451,634
Patented June 24, 1969

3,451,634

TAPE HANDLING MECHANISM

Raymond E. Le Jeune, Morton Grove, Ill., assignor to Teletype Corporation, Skokie, Ill., a corporation of Delaware Filed Aug. 15, 1967, Ser. No. 660,744
Int. Cl. G11b *15/32;* B65h *25/26*
U.S. Cl. 242—55.11 10 Claims

ABSTRACT OF THE DISCLOSURE

A tapewinding and unwinding mechanism for use with pullback tape devices comprising a first tape reel control device including a vertically extending slider track having a length at least half as long as the longest length of tape pulled back by the tape device, a slider mounted in the track for movement against and with the action of gravity, a switch mounted in the slider track for actuation by the slider to control the winding of tape and a stationary tensioner for controlling the tension of the wound tape and a second tape reel control device including a vertically extending slider track, a slider mounted in the track for movement against and with the action of gravity and two switches both mounted in the slider track for actuation by the slider, one for controlling the winding of tape and the other for controlling the unwinding of tape.

*Background of the invention*

Tapewinding and unwinding devices frequently employ pivotally mounted tension arms to control tape reel motion either by coupling and uncoupling a clutch or by controlling the flow of current to a motor. Such devices have proven unsatisfactory for use with pullback tape devices because they do not allow a sufficient length of tape to be pulled back and because they impose a varying load on the pullback device depending on the amount of tape pulled back. Another problem frequently encountered in the use of tapewinders having facilities for simultaneously winding tapes coming from two sources is the lack of a power unwinder for assisting in the unwinding of the large reels of tape frequently employed in modern data communications systems.

*Summary of the invention*

In the preferred embodiment a tape handling mechanism for use with pullback tape devices includes a tapewinding control member mounted for sliding movement over a course of sufficient length to allow complete freedom of tape pullback. Movement of the winding control member is with and against the forces of gravity and friction only so that the force necessary to pull back tape does not vary with the amount of tape pulled back. Winding tension is controlled solely by a stationary tensioner so that the tape is wound to a uniform tension regardless of the position of the winding control device.

The tape handling mechanism also includes a second slidably mounted control member and two reel controlling switches both mounted for actuation by the second control member. The switches are positioned such that a tape reel controlled by the switches operates in either a tapewinding or a tape unwinding mode thereby allowing either simultaneous winding of tapes coming from two sources or power unwinding of large reels of tape.

*Description of the drawings*

A more complete understanding of the invention may be had by referring to the following detailed description when taken in conjunction with the drawings wherein.

*Detailed description*

Figures 1, 2:
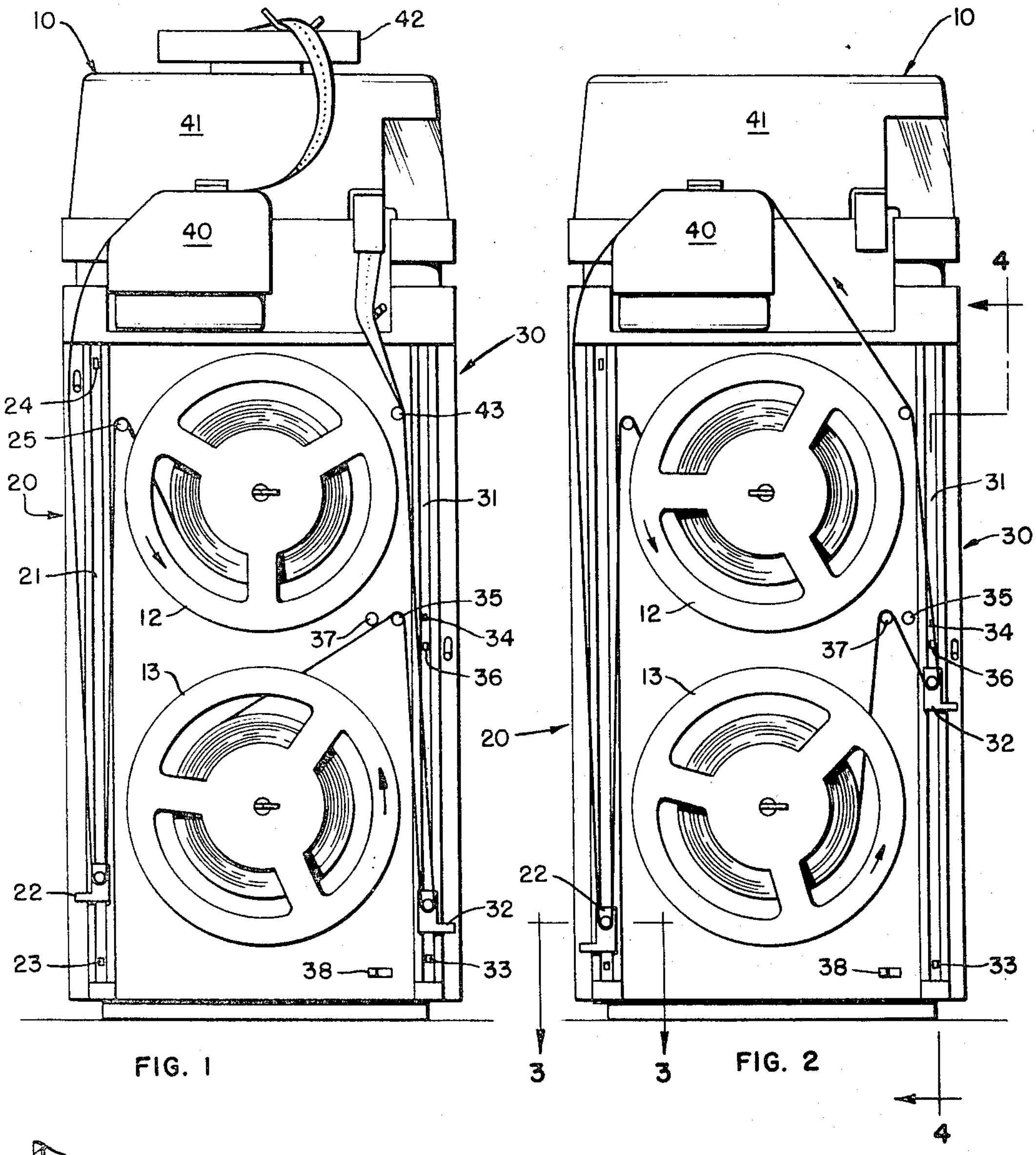
FIG. 1 is a front view of a tape handling mechanism employing the present invention in which the tape has been threaded in a double tapewinding manner.
FIG. 2 is a view similar to FIG. 1 in which the tape has been threaded in a power unwinding manner.

Referring now to the drawings, wherein like reference numerals designate like parts throughout the several views, with particular reference being had to FIG. 1, there is shown a tape or web winding and unwinding stand 10 including a first tape reel 12 and a second tape reel 13. The tape reels 12 and 13 are mounted for rotation independently of each other in a counterclockwise direction to wind or unwind tape depending on the threading of the tape in the tape winding and unwinding stand 10.

Rotation of the reels 12 and 13 is controlled by a pair of slider mechanisms 20 and 30 positioned adjacent the reels. The slider mechanism 20 includes a slider track 21 and a slider 22 mounted in the track 21 for movement upwardly and downwardly against and with the force of gravity and against the force of friction. The slider mechanism 20 further includes a switch 23 positioned at the bottom of the track 21 for actuation by the slider 22, a slider latch mechanism 24 mounted at the top of the track 21 for retaining the slider in a raised position and a tape tensioner 25 positioned between the track 21 and the first reel 12 for controlling the tension of tape as it is wound onto the reel.

The slider mechanism 30 is similar to the slider mechanism 20 in that it includes a slider track 31, a slider 32 mounted in the track 31 for movement upwardly and downwardly against and with the force of gravity and against the force of friction, a switch 33 positioned at the bottom of the slider track 31 for actuation by the slider 32, a slider latch mechanism 34 for retaining the slider in a raised position and a tape tensioner 35 positioned between the track 31 and the reel 13 for controlling the tension of tape as it is wound onto the reel. The slider mechanism 30 differs from the mechanism 20 in several significant respects. First, the slider mechanism 30 includes an additional switch 36 mounted in the track 31 for actuation by the slider 32. Second, the slider mechanism 30 includes a nontensioning tape guide 37 in addition to the tape tensioner 35. Third, the mechanism 30 includes a switch 38 for controlling which of the slider actuated switches 33 and 36 controls the rotation of the reel 13. Finally, the latch mechanism 34 and the tensioner 35 of the slider mechanism 30 are positioned somewhat lower with respect to the track 31 than the positioning of the equivalent parts in the mechanism 20 with respect to the track 21.

Positioned on top of the tapewinding and unwinding stand are tape utilization devices which typically include a tape reader 40 and a reperforator 41. Modern day tape utilization devices are frequently of the pullback variety, that is, they are equipped with mechanisms for pulling back tape previously operated on. In the case of tape readers, tape is typically pulled back out in order to re-read and re-transmit information previously read and transmitted. In the case of reperforators, tape is typically pulled back in order to erase by over-punching information previously recorded. In both cases the pullback operations are part of error detection and correction schemes which assure the reception of perfect data at a remote point.

Winding of a tape or web coming from the reader 40 is accomplished by threading the tape or web from an auxiliary tape supply unit 42, through the reader 40, under the slider 22, over the tape tensioner 25 and into the reel 12. As tape is emitted by the reader 40 the slider 22 is lowered with respect to the track 21. The switch 23 and the reel 12 are interconnected in such a way that the reel 12 is rotated whenever the switch 23 is operated. Therefore, whenever the reader 40 has emitted enough tape to lower the slider 22 into engagement with the switch 23 the reel 12 is rotated in a counter-clockwise direction and winds up the tape coming from the reader 40. Whenever sufficient tape has been wound to disengage the slider 22 from the switch 23 winding is discontinued.

The winding control mechanism 20 is particularly useful with pullback tape readers for several reasons. First, the tension of the tape wound onto the reel 11 is controlled solely by the tensioner 25 and is in no way dependent upon the position of the slider 22. This result is useful even in non-pullback tapewinding mechanisms. Second, the load imposed on the pullback portion of the tape reader is constant since upward movement of the slider 22 in the track 21 is resisted by gravity and friction only and, therefore, is not dependent upon the position of the slider 22 in the track 21. Finally, the track 21 is purposely made at least half as long as the longest length of tape which will ever be pulled back by the reader. This assures complete freedom of tape pullback without the necessity of unwinding tape from the reel 11 against the action of the tensioner 25.

Winding of a tape or web coming from the reperforator 41 is accomplished by threading the tape or web from the reperforator 41 over a non-tensioning guide 43 under the slider 32, over the tape tensioner 35 and into the reel 12. The mechanism 30 operates similarly to the mechanism 20 in that tape is wound onto the reel 12 whenever the slider 32 is in engagement with switch 33. Like the mechanism 20, the mechanism 30 allows tape to be pulled back against the forces of gravity and friction only until the slider 32 is raised to a position wherein the slider is adjacent the latch 34. Since reperforator pullback systems seldom pull back as much tape as reader pullback systems, it is usually not necessary to mount the latch 34, the tensioner 35, the switch 36 and the guide 37 at the top of this track 31. It should be understood, however that such positioning is possible in systems necessitating it.

Referring now to FIG. 2 the tapewinding and unwinding stand 10 is shown employed in a power unwinding mode. Tape is threaded from the reel 13, over the non-tensioning guide 37 (rather than over the tensioner 35), under the slider 32, over the guide 43 and into the reader 40. In this mode of operation the switch 38 is operated to place rotation of the reel 13 under control of the switch 36. The reader 40 advances tape and thereby lifts the slider 32 until the slider 32 engages the switch 36 whereupon the reel 13 is rotated until the slider 32 no longer engages the switch at which time rotation of the reel 13 is discontinued. During power unwinding the operation of the slider mechanism 20 in controlling the operation of the upper reel 12 is exactly the same as its operation described above in conjunction with FIG. 1.

Figure 3:
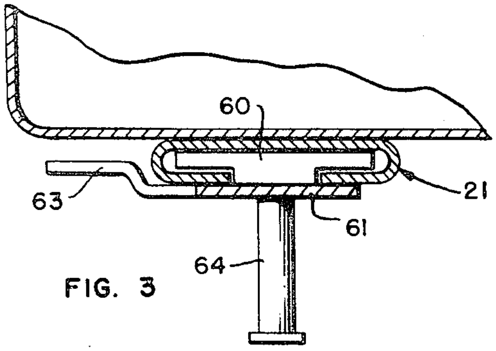
FIG. 3 is an enlarged partial sectional view taken along the line 3—3 in FIG. 2 in the direction of the arrows which shows details of the slider and slider track portion of the invention.
Figures 4, 5:
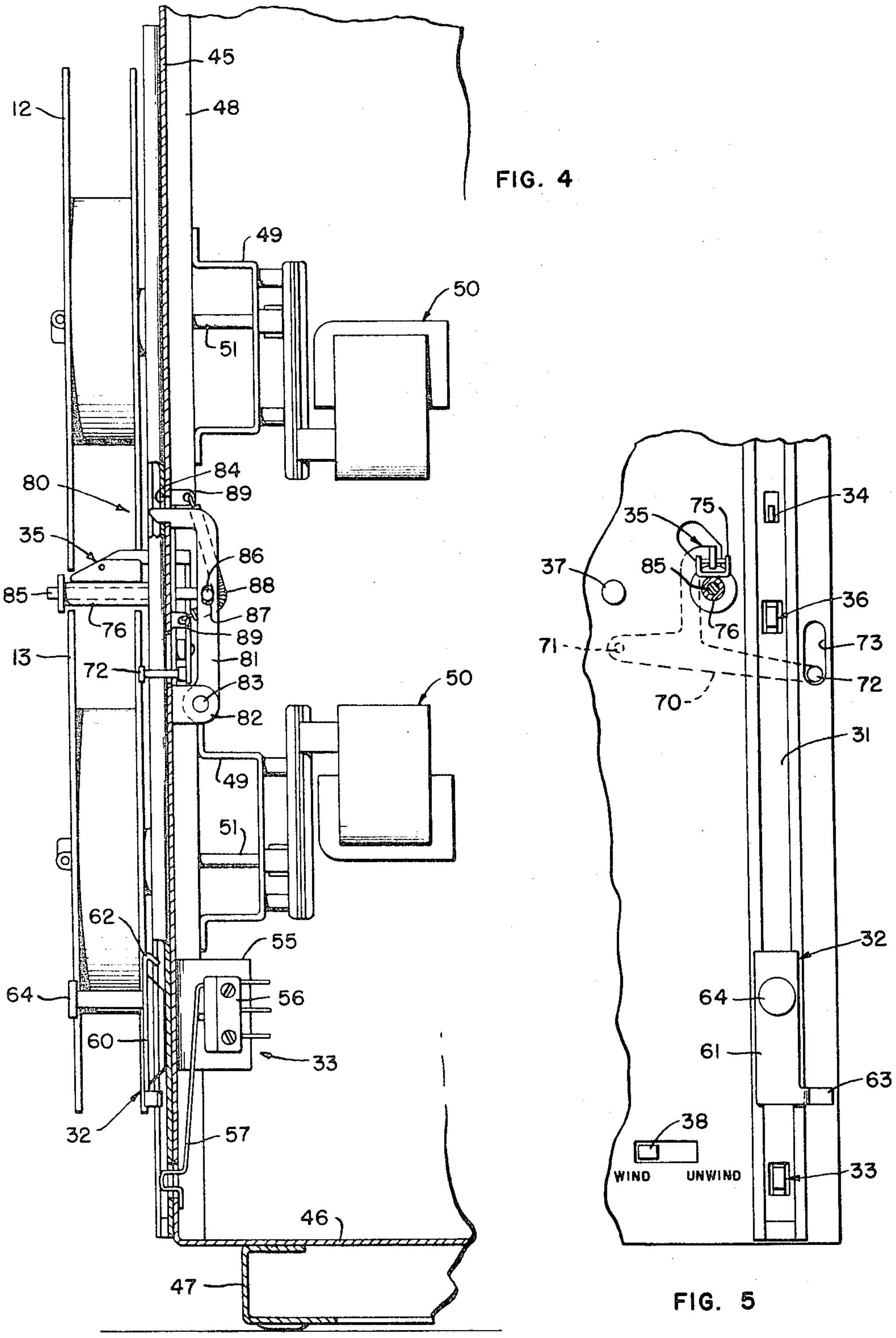
FIG. 4 is a sectional view taken along the line 4—4 in FIG. 2 in the direction of the arrows which shows several details of construction of the device shown in FIG. 1.
FIG. 5 is an enlarged view of the lower right hand portion of the device shown in FIG. 1 which shows certain details of the slider latch portion of the invention.

Referring now to FIGS. 3 and 4 the details of the mechanism shown in FIGS. 1 and 2 will be more fully set forth. As is best shown in FIG. 4, the tapewinding and unwinding stand 10 is comprised of a front plate 45 and a bottom plate 46 which may be either formed integrally with or suitably joined to the front plate 45. Attached to the bottom plate 46 is a suitable foot 47 which supports the tapewinding stand on a floor or other support. Attached to the front plate 45 is a reinforcing brace 48 which extends from the top to the bottom of the stand 10.

Mounted on the reinforcing brace 48 are a pair of brackets 49 each of which supports a gearmotor 50. The gearmotors 50 have output shafts 51 which extend through the front plate 45 and which support the reels 12 and 13. Under this arrangement whenever electric power is supplied to one of the gearmotors 50 the reel mounted on the output shaft 51 of the gearmotor is rotated.

Mounted on the front plate 45 are three brackets 55 only one of which is shown. The brackets 55 each support one of the switches 23, 33 and 36 of which only switch 33 is shown in FIG. 4. The switch 33 is comprised of a plunger-type switch 56 mounted on the bracket 55 and operated by a switch operating arm 57 which extends through a hole in the front plate 45 into the slider track 31. The switches 23 and 36 include similar switches 56 and switch operating arms 57 which similarly extend into their respective slider tracks. It should be understood that the switches 23, 33 and 36 need not be mechanical in nature but could be of any suitable type, particularly photoelectric. Similarly, the drive mechanism for the reels 12 and 13 need not be comprised of the gearmotors 50 but may consist of any suitable constantly rotating power source and a pair of clutches the engagement of which is controlled either electrically or mechanically by the switches 23, 33 and 36.

Referring to FIGS. 3 and 4 the details of the sliders 22 and 32, which are substantially identical except that they are mirror images one of the other, are shown. Each of the sliders includes a body portion 60 which has a T-shape when viewed from the above as in FIG. 3 and which has inwardly sloping end surfaces when viewed from the side as in FIG. 4. Attached to the body member is a front plate member 61 which serves to retain the body member 60 in the proper slider track and which is provided with a hook 62 at its upper end. Extending from the front plate member 61 is an arm 63 which in the case of the slider 22 extends to the left and which in case of the slider 32 extends to the right. Secured to and extending from the body portion 60 is a tape guide post 64 under which tape is threaded.

Referring now to FIG. 5 there is shown portions of the slider latch mechanism 34 which is substantially identical to the latch mechanism 24. The mechanism includes a lever 70 pivotally mounted on the front plate 45 by a pivot 71 and having a finger 72 extending through a hole 73 in the front plate 45 adjacent the slider track 31. An upwardly extending arm 74 on the lever 70 carries a tension shoe 75 which engages a stationary finger 76 mounted on the front plate 45 to form the tape tensioner 35. It is apparent from the above that the tape tensioner 25 is formed from parts similar to the parts 75 and 76 from which the tensioner 35 is formed. From FIG. 5 it should be apparent that when the slider 32 is raised to an elevated position the arm 63 engages the finger 72 of the lever 70 thereby pivoting the lever about the pivot 71. This action raises the shoe 75 off the finger 76 thereby forming a path through the tensioner 35. At this time the finger 64 of the slider 32 is positioned just above the finger 76 of the tensioner 36 so that a straight line exists extending perpendicularly to the slider track 31 and running under the bottom of the finger 64, over the top of the finger 76 and under the bottom of the shoe 75.

The mechanism shown in FIG. 5 is aided by a slider latching mechanism 80 which is shown in the middle of FIG. 4 and which completes the slider latch 34. The mechanism 80 includes a latch 81 which is pivotally supported on a bracket 82 that is attached to the front plate 45 by a pivot 83 and which extends through a hole 84 in the front plate 45 into the slider track 31. A latch release button 85 is slidably mounted in the center of the finger 76 of the tensioner 35 and includes a right angle portion 86 which extends through a hole in the latch 81. A tension spring 88 is attached to a pair of brackets 89 mounted on the front plate 45 and extends over the right angle portion 86 of the button 85 thereby urging the button 85 outwardly and rocking the latch 81 counterclockwise about the pivot 83 through the hole 84 into the slider track 31.

The latch 81 and hook 62 on the top of the slider 32 are provided with cooperating camming surfaces so that when the slider 32 is raised to an elevated position the latch 81 is rocked clockwise about the pivot 83 until it clears the hook 62 whereupon it is driven under the hook 62 by the spring 88. When the latch 81 is under the hook 62 the slider 32 is retained in an elevated position and, due to the interaction of the arm 63 of the slider 32 and the finger 72 of the lever 70, the shoe 75 of the tensioner 35 is retained in an elevated position with respect to the finger 76. Thus, since both the slider and the shoe are latched in a raised position and since the finger 64 of the slider is positioned slightly above the finger 76 of the tensioner 35 both hands of the operator are free to insert tape into the device in a straight line manner.

As soon as the tape is properly threaded the operator simply pushes the button 85 toward the front plate 45. This forces the latch 81 to rock clockwise about the pivot 83 until the latch 81 clears the hook 62 on slider 32 whereupon the slider falls downwardly in the track 31 under the action of gravity. This action disengages the finger 63 from the finger 72 of the lever 70 thereby lowering the tension shoe 75 into engagement with the finger 76 and returning the device to the condition shown in FIG. 1. It should be understood that while only the latch mechanism 34 has been shown and described in the drawing, the latch mechanism 24 of the slider mechanism 20 is exatctly identical to the latch mechanism 34 except that some of the parts are reveresed in their orientation.

I claim:

1. A tape handling apparatus for use with a tape utilization device including:
- a frame;
- a pair of tape reels mounted on the frame;
- a pair of slider tracks mounted on the frame adjacent the tape reels;
- a pair of sliders one mounted in each of the tracks for movement therein against and with the action of gravity;
- means for directing tape from one of the tape reels into engagement with the slider in one of the tracks and then into the tape utilization device so that the position of the slider in said one of the tracks is controlled by the amount of tape between said one of the reels and the utilization device;
- means for directing tape from the tape utilization device into engagement with the slider in the other of the tracks and then into the other of the tape reels so that the position of the slider in said other of the tracks is controlled by the amount of tape between the utilization device and said other of the reels;
- means responsive to the position of the slider in said one of the tracks for causing said one of the reels to unwind tape for use by the tape utilization device, and
- means responsive to the position of the slider in said other of the tracks for causing said other of the reels to wind tape coming from the tape utilization device.

2. The apparatus according to claim 1 wherein the means responsive to the position of the slider in said one of the tracks includes an electric motor coupled to said one of the reels for rotating the reel and a switch mounted on the frame adjacent said one of the tracks for actuation by the slider in said one of the tracks to control rotation of the reel and wherein the means responsive to the position of the slider in said other of the tracks includes an electric motor coupled to said other of the reels for rotating the reel and a switch mounted on the frame adjacent said other of the tracks for actuation by the slider in the other of the tracks to control the rotation of the reel.

3. The apparatus according to claim 1 further including means positioned on the frame between said other of the tracks and said other of the reels for imparting tension to the tape after its engagement with the slider in the other of the tracks thereby assuring that the tape is wound tightly onto said other of the reels.

4. The apparatus according to claim 1 wherein the tape utilization device is of the pullback variety and wherein the said other of the tracks is at least as long as one half the length of the longest length of tape pulled back by the tape utilization device thereby permitting complete freedom of tape pullback by the tape utilization device.

5. A web winding mechanism for use in data communications systems including devices adapted to pull back long lengths of tape including:
- means for receiving a web coming from the pull back device;
- a slider track having a length at least equal to half the length of the longest length of web to be pulled back by the pull back device;
- a slider mounted in the slider track for movement therein under control of the web coming from the pullback device and going to the web receiving means;
- means responsive to the position of the slider in the slider track for producing an output, and
- means responsive to the output of the position responsive means for causing the web receiving means to take up the web.

6. The winding mechanism according to claim 5 wherein the slider track extends vertically and wherein pullback of the web is opposed by the weight of the slider so that the force necessary to effect pullback does not vary with the amount of web pulled back.

7. The device according to claim 6 further including a tensioner positioned between the slider track and the web receiving means for resisting the take up of the web by the web receiving means thereby assuring that the web is taken up in a taut condition.

8. A winding and unwinding mechanism including:
- a reel;
- a slider track positioned adjacent the reel;
- a slider mounted on the slider track for movement with respect to the track against and with the action of gravity;
- first control means mounted adjacent the slider track for detecting the presence of the slider at a first predetermined position on the track and for producing an output upon such detection;
- second control means mounted adjacent the slider track for detecting the presence of the slider at a second predetermined position on the track and for producing an output upon such detection;
- means for rotating the reel in response to the output of either of the control means, and
- means for selectively coupling the output of either the first or the second control means to the rotating means.

9. The mechanism according to claim 8 further including means for directing tape into the reel from one direction when the first control means is coupled to the rotating means thereby causing rotation of the reel to wind tape onto the reel and for directing tape out of the reel in another direction when the second control means is coupled to the rotating means thereby causing rotation of the reel to unwind tape from the reel.

10. The mechanism according to claim 8 wherein the control means are switches having components extending into the slider track for actuation by the slider.

References Cited

UNITED STATES PATENTS

| | | | |
|---|---|---|---|
| 1,889,546 | 11/1932 | Gates | 242—75.5 |
| 1,773,607 | 8/1930 | Daniels | 242—75.5 |
| 2,427,056 | 9/1947 | Keyes | 178—17 |
| 2,904,332 | 9/1959 | Metzner | 271—2.1 |

LEONARD D. CHRISTIAN, *Primary Examiner.*

U.S. Cl. X.R.

226—118; 242—75.5